United States Patent [19]

Takatori

[11] Patent Number: 5,282,585
[45] Date of Patent: Feb. 1, 1994

[54] PHOTOGRAPHIC FILM CASSETTE

[75] Inventor: Tetsuya Takatori, Kanagawa, Japan

[73] Assignee: Fuji Photo Film Co., Ltd., Kanagawa, Japan

[21] Appl. No.: 866,811

[22] Filed: Apr. 9, 1992

[30] Foreign Application Priority Data

Apr. 9, 1991 [JP] Japan .................................. 3-103929

[51] Int. Cl.$^5$ .............................................. G03B 17/26
[52] U.S. Cl. .................... 242/71.1; 242/71.9; 354/275
[58] Field of Search ................. 242/71, 71.1, 71.7, 242/71.8, 71.9; 354/275

[56] References Cited

U.S. PATENT DOCUMENTS

| 4,407,579 | 10/1983 | Huff . | |
|---|---|---|---|
| 4,832,275 | 5/1989 | Robertson | 242/71.1 |
| 4,846,418 | 7/1989 | Fairman | 242/71.1 |
| 4,887,776 | 12/1989 | Niedospial, Jr. et al. | 242/71.1 |
| 4,908,641 | 3/1990 | Fairman | 242/71.1 |
| 4,991,786 | 2/1991 | Cloutier et al. | 242/71.1 |
| 5,040,739 | 8/1991 | Wolf et al. . | |

FOREIGN PATENT DOCUMENTS

| 2921379 | 11/1980 | Fed. Rep. of Germany . | |
|---|---|---|---|
| 8001960 | 9/1980 | World Int. Prop. O. | 242/71.8 |

Primary Examiner—Thomas B. Will
Attorney, Agent, or Firm—Sughrue, Mion, Zinn, Macpeak & Seas

[57] ABSTRACT

A photographic film cassette has a spool for winding photographic film in a roll. A film leader is caused to advance outward from a cassette shell through a film passageway, when the spool rotates in an unwinding direction. A circumferential lip is formed around a first spool flange, projects toward the roll, and has a bevelled face for contact with a first lateral edge of the film along outer turns. A cam mechanism associated with two spool pieces shortens the spool while rotating the spool in the unwinding direction, and lengthens the spool while rotating the spool in the wind-up direction. When shortened, an interval between two flanges is reduced enough to firmly clamp lateral sides of the roll between the flanges. When lengthened, the flange interval is enlarged enough to release the lateral sides from the clamping force. The film is wound up without lateral flexure.

29 Claims, 9 Drawing Sheets

PHOTOGRAPHIC FILM CASSETTE

BACKGROUND OF THE INVENTION

1. Field of the Invention:

The present invention relates to a photographic film cassette of which rotation of a spool causes a film leader to advance to the outside of a cassette shell, more particularly to an improvement of a construction for advancing the leader.

2. Description of the Related Art:

A known photographic film cassette includes a photographic filmstrip (hereinafter referred to as film) positioned so that a film leader does not protrude from a cassette shell prior to loading the cassette in a camera, as disclosed in U.S. Pat. No. 4,887,776. Simple film-advancing mechanisms of the camera are used with the type of cassette and include a construction which rotates a spool to unwind the film, thereby causing the leader to move through a film passageway and exit from the cassette.

In this construction, a roll of the film wound about the spool is prevented from loosening in order to transmit rotation of the spool to the leader. The spool is constituted of a pair of spool pieces slidable relative to each other. A first spool piece is associated with a first flange, whereas the second spool piece is associated with a second flange. When a predetermined one of the spool pieces is rotated, a cam mechanism associated with both spool pieces operates so as to shorten the interval between the flanges by sliding the spool pieces.

The first flange is provided with a circumferential lip which projects from its periphery and has a bevelled lip inclined on its inside face for contact with a side of the outermost turn of the roll of film in order to prevent the roll from loosening. When sliding the spool pieces, the outermost turn of the roll is clamped between the second flange and the bevelled lip so that the roll is rotatable integrally with the spool and is kept from loosening. A spring washer is disposed between the first flange and a lateral inside surface of the roll chamber of the cassette shell for biasing the first flange in a direction tending to clamp the roll in the widthwise direction of the film.

There is, however, a problem in such a cassette in that the filmstrip may have an unusually small width due to shrinkage over time or a change in ambient conditions. Also, the cutting process, during manufacture of the film, may yield errors in size. In conventional cassettes, it has been impossible to firmly clamp the roll of an unusually narrow film between the flanges. This causes the likelihood of a failure in advancing the leader of such a film.

Another disadvantage of this type of cassette is that when the film is wound up into the cassette shell, its lateral edge is successively pressed and flexed by the lip. The lateral flexure of the lateral edge causes a large resistance to transportation of the film, so that a torque necessary for rotating the spool is excessively enlarged.

Because the roll becomes larger during wind-up, it is possible that flexure at one portion along the lateral edge may cause a downstream portion of film to turn around the outer periphery of the flange and thus be trapped between the flange and the cylindrical surface of the roll chamber of the cassette shell. The lateral edge, thus, would fail to be in contact with the bevelled lip. Such a difficulty is particularly likely because the spring washer constantly presses on the flange inward.

SUMMARY OF THE INVENTION

In view of the foregoing problems, an object of the present invention is to provide a photographic film cassette in which a roll of film can be reliably clamped between two flanges even if the width of the film is smaller than standard size.

Another object of the present invention is to provide a photographic film cassette in which lateral edges of a film can be consistently brought into contact with inside faces of the flanges without wrapping around the outer surface of either flange when the film is wound up into a cassette shell.

In order to achieve the above and other objects and advantages of this invention, a circumferential lip is formed on a periphery of a first spool flange to project toward a roll of film on the spool. An inclined face is formed on the lip so as to contact a lateral edge of the film along at least an outer turn of the roll and a first annular ridge is formed in the roll chamber for contact with a cylindrical surface of the roll in order to maintain a diameter of the roll that is less than or equal to a diameter of an outer circumference of the inclined lip face. A length adjusting device changes the spool from a lengthened state to a shortened state while rotating the spool in an unwinding direction, and from the shortened state to the lengthened state while rotating the spool in a wind-up direction which is opposite to the unwinding direction. In the shortened state, an interval $L_1$ between a middle face of the first flange and an inside face of a second flange is reduced to at most a standard width W of the film in order to clamp lateral sides of the roll between the first and second flanges. In the lengthened state, an interval $L_2$ between the outer circumference of the lip and the inside face of the second flange is enlarged over a standard width W in order to release the lateral sides from being clamped by the flanges.

In a preferred embodiment, at least one portion of the first annular ridge projects into a first spatial domain in order to prevent the first lateral edge from wrapping around the lip when winding the film up into a cassette shell. This first domain is an interior of a body of revolution being a locus of quadrilateral PQTS as revolved around a central axis of the spool. P is one point lying on the outer circumference of the lip when the spool is in the shortened state. Q is a point 3 mm away from point P in a direction of the axis. S is point where a line passing through a point R and parallel with the axis intersects a line passing through the point P and vertical to the axis, where R is a point at which an inner circumference of the lip is crossed by a plane in which the point P and the axis lie. Finally, T is a point 5.5 mm away from the point S in the axial direction towards the other flange.

Further, at least one portion of a first passage ridge projects into a second spatial domain in order to prevent the first lateral edge from turning around the lip when winding the film up into the cassette shell. The second domain is an interior of a quadrangular prism being a locus of the quadrilateral PQTS as moved in a direction of advancing a film leader from a position of separating the leader from the roll.

In accordance with the present invention, a roll of film can be clamped between the flanges even if its width is slightly smaller than standard size. The lateral edges can be unfailingly brought into contact with inside faces of flanges without wrapping around either flange when the film is wound up into a cassette shell. Also, a large resistance is not applied by either flange to advancement of the film, so that only a small torque is necessary for imparting rotation to the spool to wind up the film.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
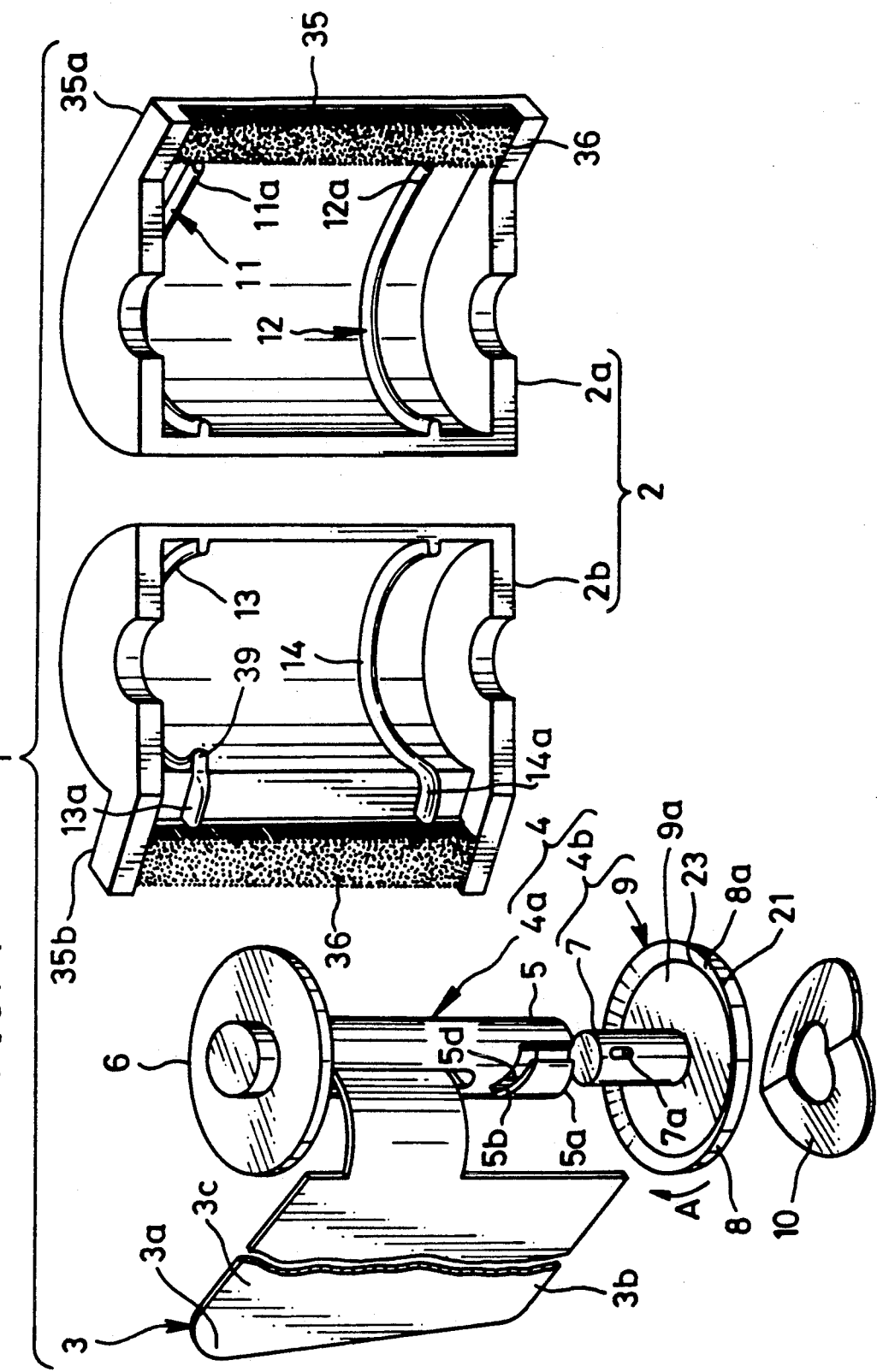
FIG. 1 is an exploded perspective view illustrating a photographic film cassette according to a first embodiment of the present invention.
Figure 2:
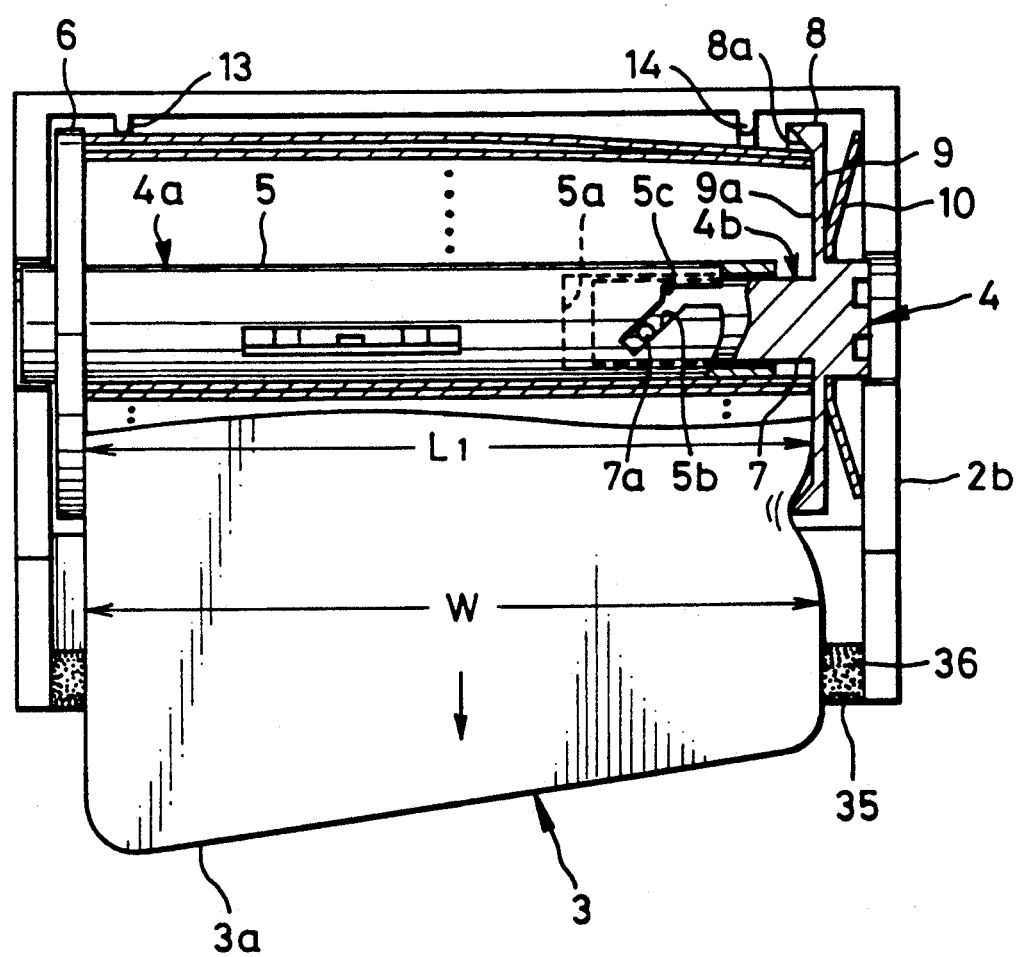
FIG. 2 is a vertical section illustrating a state in which a film is advanced from inside a cassette shell.

In FIGS. 1 and 2, illustrating the first embodiment of the invention, a photographic film cassette 1 has a cassette shell 2 constituting a pair of resinous shell halves 2a and 2b. A photographic film 3 is adapted to be wound around a spool 4 in a roll. The spool 4 is contained rotatably in the cassette shell 2 and consists of spool pieces 4a and 4b coupled together so as to lengthen and shorten the spool 4 upon relative rotation therebetween. The spool piece 4a has a core 5 and a flat flange 6 formed integrally therewith. A hollow portion 5a is formed in the core 5. A cam groove is also formed on the core 5 and has two cam edges 5b and 5d. The spool piece 4b has a core 7 and a flange 9 formed integrally therewith. The core 7 is slidably and rotatably received in the hollow portion 4a. A pin 7a or a cam follower is formed on the core 7 so as to be engaged with the cam edges 5b and 5d in operation.

An inclined or bevelled face 8a is formed, in an annular manner, on lip 8 which extends from flange 9 toward flange 6. Reference numerals 21 and 23 respectively designate outer and inner circumferences of the lip bevelled face 8a. Between the flange 9 and the inside of the cassette shell 2 is disposed a spring washer 10 for biasing the flange 9 toward the flange 6. When the spool piece 4b is rotated in the unwinding direction (the direction of the arrow A), the flange 9 is moved toward the flange 6 so as to clamp the roll of the film 3 through contact with a lateral side of the roll, which is the lateral edge 3b of the film 3. When the spool piece 4b is rotated in the wind-up direction, opposite to the arrow A, the flange 9 is moved away from the flange 6 so as to release the roll of film 3 from the clamped state. The biasing force of the spring 10 does not prevent the flange 9 from moving apart from the flange 6 while rotating the spool piece 4b in a direction opposite to the direction indicated by arrow A.

A film passageway 35 is defined between the shell halves 2a and 2b for allowing the film 3 to pass therethrough. In particular, the passageway 35 is defined between upper and lower passage surfaces 35a and 35b formed each on the shell halves 2a and 2b. A plush or light-trapping fabric 36 is disposed in the passageway 35, as is well-known in the art. A separator claw 39 is formed on the lower shell half 2b at a position inward from the passageway 35. When a leading end of a leader 3a of the film 3 rotates to come close to the lower passage surface 35b, the separator 39 separates it from the roll in order to direct it to an exterior of the cassette 1 through the passageway 35.

In accordance with the present standard of the J135 type photographic film cassette, the standard width of the film 3 is 35.00 mm (+0 mm to −0.10 mm). There are, however, cases where the width of the film is reduced, due to errors in cutting filmstrips during manufacture, volatilization of solvent from the emulsion layer of the film, and changes in environment and humidity, as well as other factors. It is known that the solvent volatilization and the environmental changes may give rise to comparatively large changes in the size. To be precise:

1. The volatilization of the solvent may cause a reduction of 0.3% of the width of the photographic film. Thus, the width of the 35 mm film may be equal to or below 34.9 mm, which is the lower limit of the standard width.

2. As the film support consists of triacetyl cellulose (TAC) in general, the rate of the change in width to the change in the humidity is approximately $10 \times 10^{-5}/\%RH$. The width of the film may therefore be equal to or below 34.9 mm or the lower limit of the standard width, even at about 30% of change in humidity which is very likely in general use.

Let $L_1$ be an interval between an inside face 6a of the flange 6 and a flat face 9a formed inside the flange 9 as encircled by the lip bevelled face 8a. The cam groove having cam edges 5b and 5d is formed to have such a length as to vary $L_1$ decreasingly to a distance equal to or less than the standard width W, and constitutes a length adjusting mechanism with the pin 7a. As illustrated in FIG. 2, the lateral sides 3b and 3c of the fully wound roll of the film 3 are clamped between the inside face 6a and the flat face 9a, so that the rotary force of the spool 4 is transmitted to the roll with a high efficiency.

Figure 3:
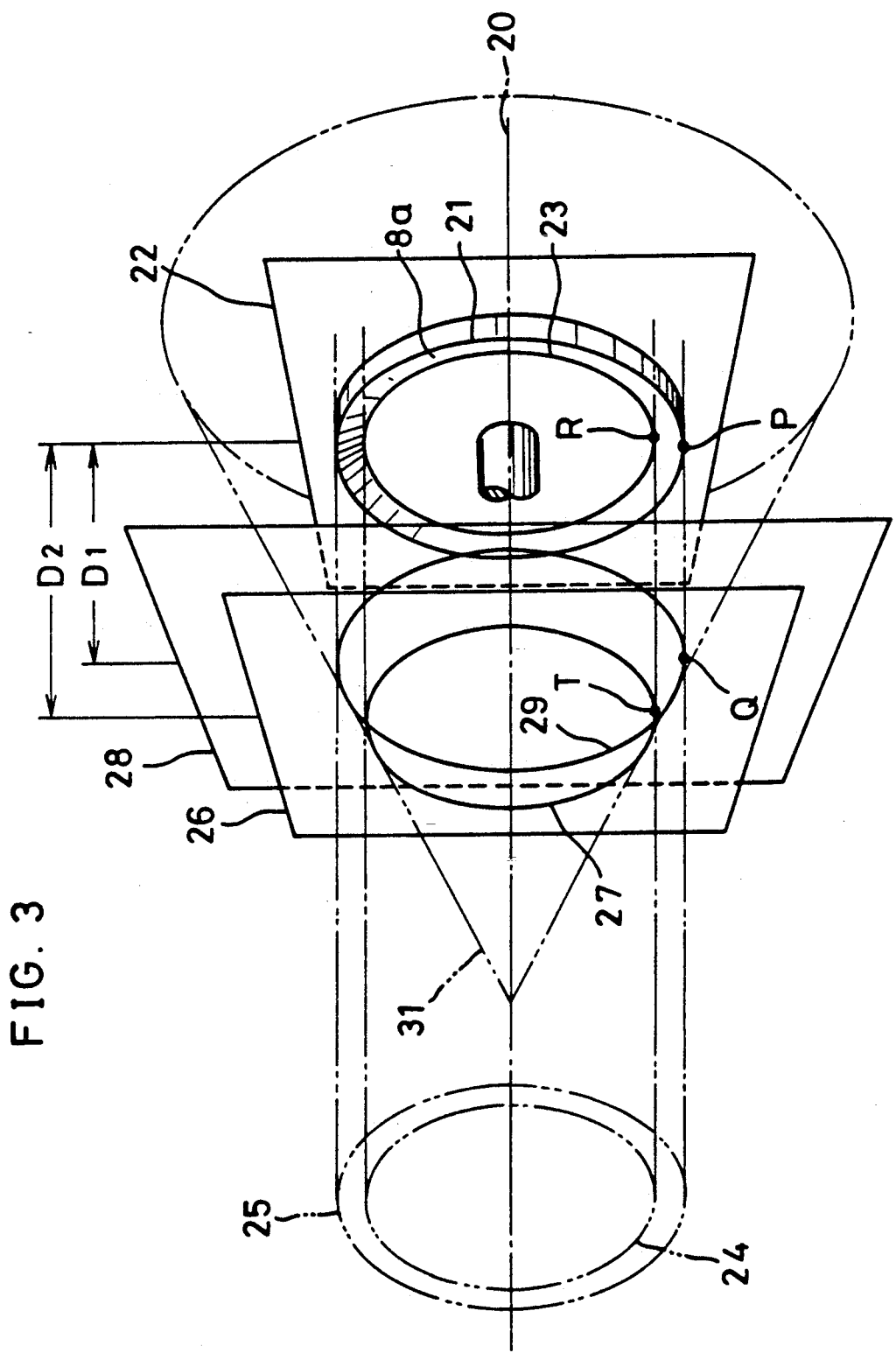
FIG. 3 is an explanatory view illustrating a first annular spatial domain in perspective.
Figure 4:
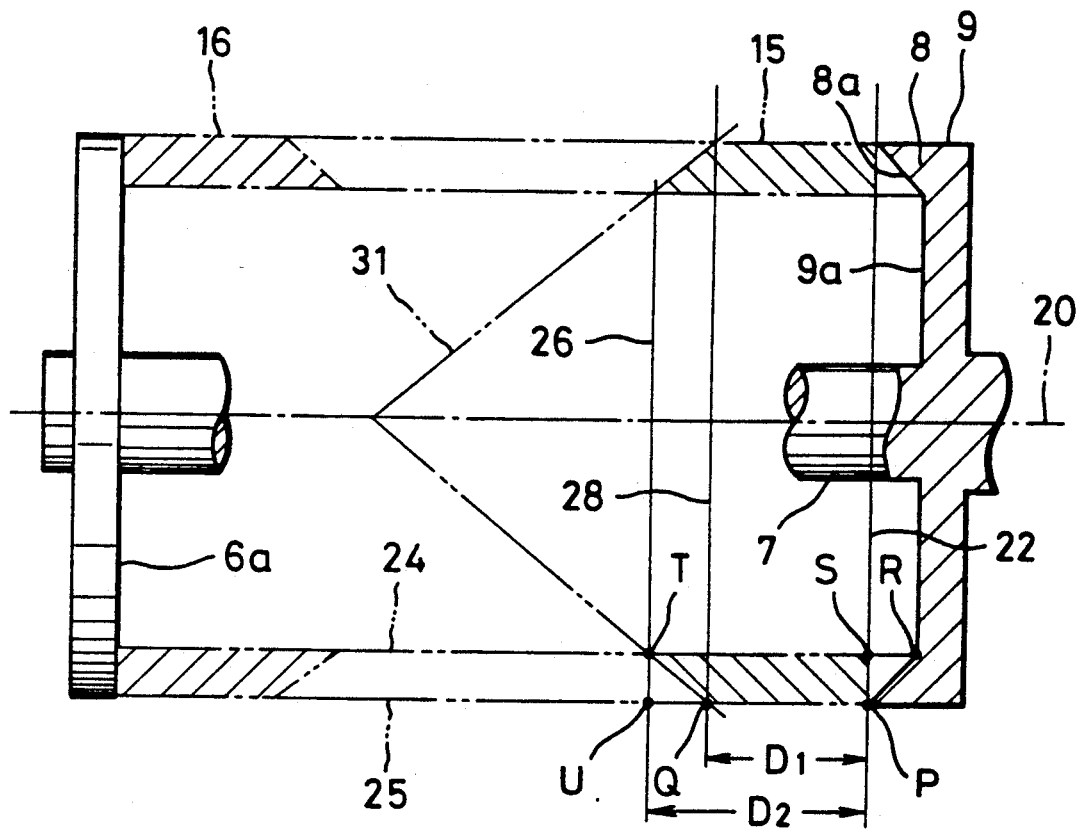
FIG. 4 is an explanatory view illustrating two annular domains in cross section.
Figure 5:
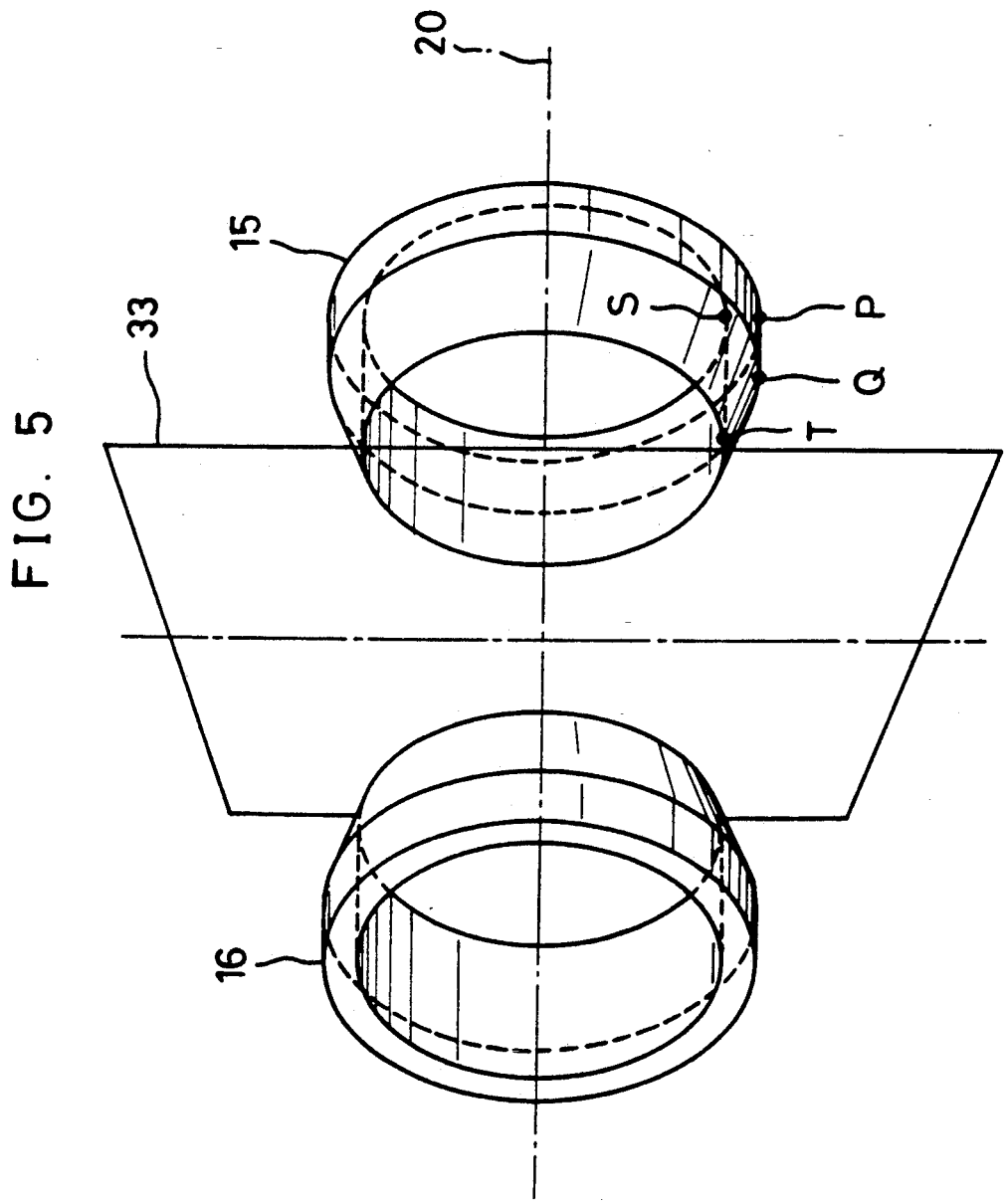
FIG. 5 is an explanatory view illustrating the two annular domains in perspective.
Figure 6:
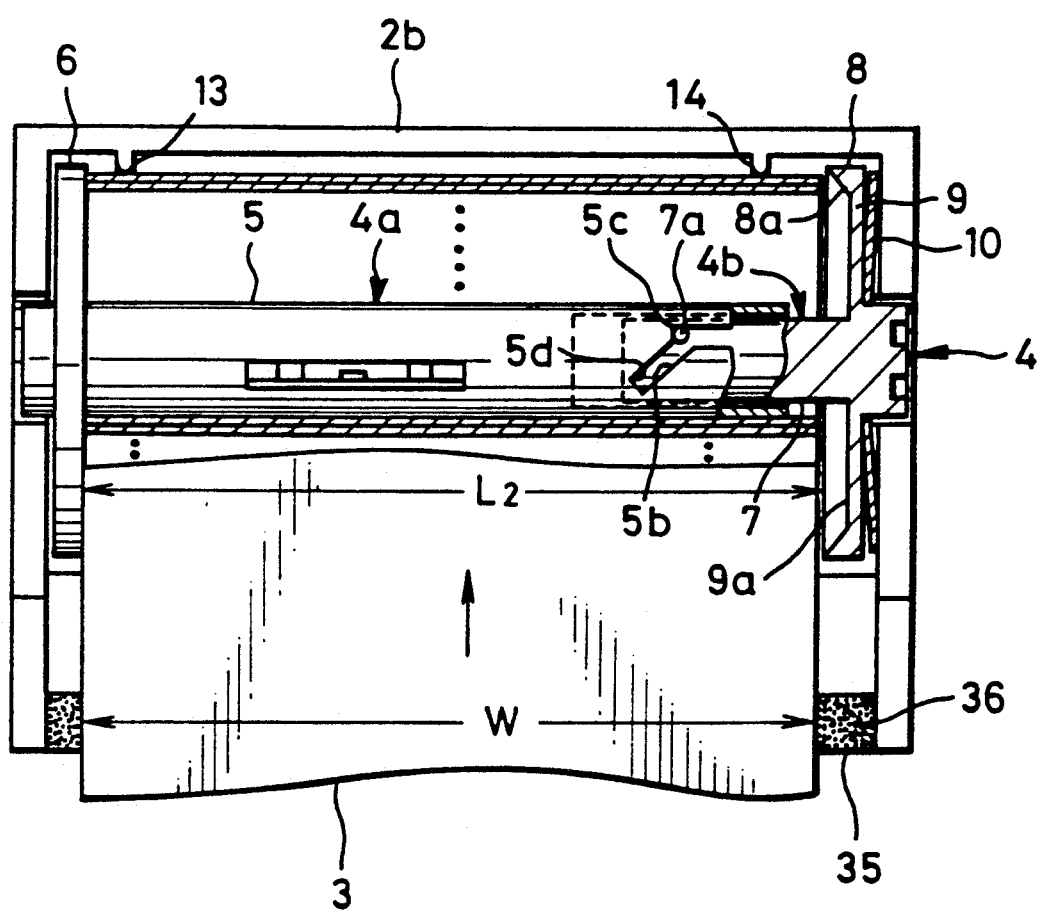
FIG. 6 is a plan view illustrating a state in which the film is wound up onto the cassette shell.

Two pairs of arcuate ridges 11 to 14 are formed on the inside of shell halves 2a and 2b defining a pair of annular ridges. As illustrated in FIGS. 3 to 5, at least one portion of the ridges 12 and/or 14 is formed to project into an annular spatial domain 15. At least one portion of the ridges 11 and/or 13 is formed to project into an annular spatial domain 16. Such constructions of the ridges 11 to 14 as illustrated in FIG. 6 regulate the cylindrical surface of the roll so as to prevent the lateral edges 3b and 3c from wrapping around the peripheries of the flanges 6 and 9 when the film 3 is wound up into the cassette shell 2. Let $L_2$ be an interval between the flange 6 and the outer circumference 21 of the lip bevelled face 8. When the film 3 is wound up into the cassette shell 2, the spool pieces 4a and 4b are slid in the extending direction so that $L_2$ becomes larger than W. Only a small resistance in thus applied by the flanges 6 and 9 to the winding of the film 3, so that only a small torque is needed to impart rotation to the spool piece 4b to wind up the film 3. It is noted that a recess 5c is formed adjacent to the cam edge 5d in parallel with the longitudinal direction of the film 3, which receives the pin 7a, and keeps the interval between the flange 6 and 9 from decreasing when the spool is rotated in the winding direction (see FIG. 6).

Referring to FIGS. 3 and 5, the annular domain 15 will now be defined. A reference numeral 20 designates an axis of rotation of the spool 4. Let P be one point lying on the circumference 21 when the spool 4 is in the shortened state. Let Q be a point at $D_1(=3$ mm$)$ away from point P toward the flange 6 in the direction parallel with the axis 20. Let R be a point where the circumference 23 is crossed by a plane in which point P and the axis 20 lie. Let S be a point where a line passing through point R and parallel with the axis 20 intersects a line passing through point P and vertical to the axis 20. Let T be a point at $D_2(=5.5$ mm$)$ away from point S toward the flange 6 in the axial direction. Joining points P and Q, Q and T, T and S, and S and P, forms a quadrilateral trapezoid PQTS. Let the trapezoid PQTS revolve around the axis 20. The annular domain 15 is defined to be the interior of a body of revolution, which is a locus of trapezoid PQTS as revolved around the axis 20.

In other words, the annular domain 15 is defined to be a spatial domain bounded by a plane 22, cylindrical surfaces 24 and 25 and a conical surface 31; wherein the plane 22 is a plane where the circumference 21 lies, the cylinders 24 and 25 are respective loci of the circumference 23 and 21 as moved parallel in the axial direction and the cone 31 is a locus of a line passing through points Q and T as revolved around the axis 20. A reference numeral 26 designates a plane $D_2$ away from the plane 22. A reference numeral 27 designates a circle where the cylinder 24, the plane 26 and the cone 31 meet together, and is a parallel displacement of the circumference 23. A reference numeral 28 designates a plane at $D_1$ away from the plane 22. A reference numeral 29 designates a circle where the cylinder 25, the plane 28 and the cone 31 meet together, and is a parallel displacement of the circumference 21. U is a point 5.5 mm away from point P toward the flange 6 in the axial direction.

The annular domain 16 is defined to be symmetrical to the domain 15 with respect to plane 33 vertical to the axis 20, and in contact with the inside face 6a of the flange 6 as illustrated in FIGS. 4 and 5. In other words, the former domain is such a displacement of the latter domain that the circumference 21 is superposed on the periphery around the inside face 6a.

The portion projecting from the ridges 12 and 14 into the annular domain 15 may be a singular one, or continuous and circumferential. A plurality of portions, however, may project into the domain 15, so that there are discontinuities of the ridges between the projection portions. The projection from the ridges 11, 13 may be formed in a similar manner.

Figure 7:
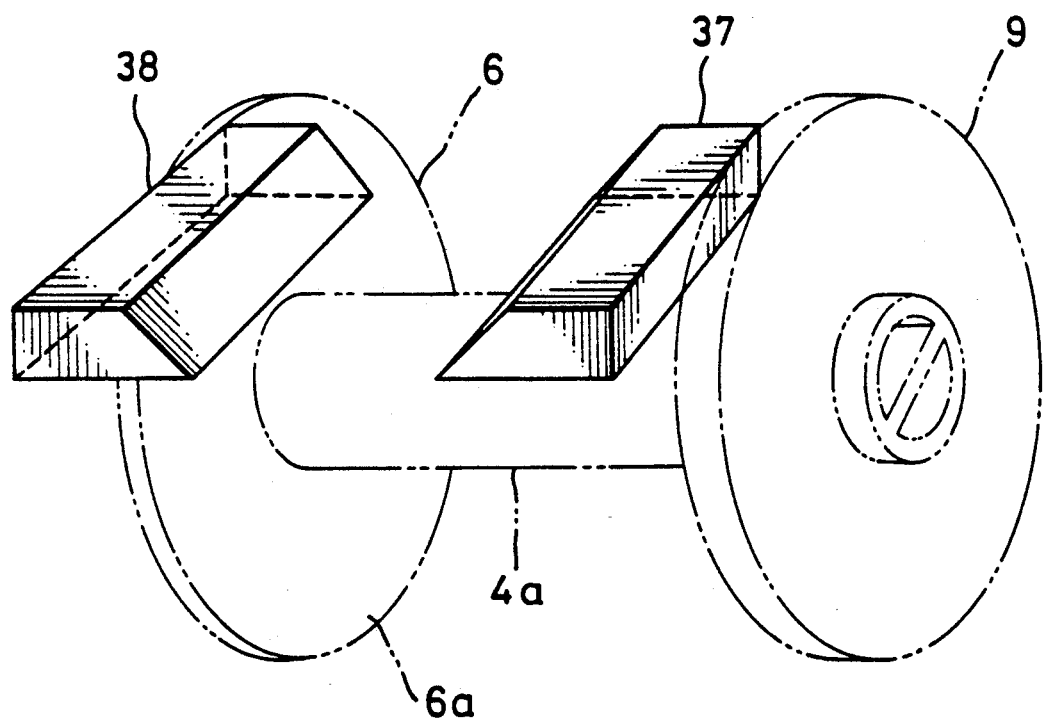
FIG. 7 is an explanatory view illustrating two block-shaped spatial domains in perspective.

Upper passage ridges 11a and 12a are formed on the upper passage surface 35a and are respectively connected to the arcuate ridges 11 and 12, which extend to the inner edge of the plush 36. The passage ridges 11a and 12a are in contact with the upside or back surface of the film 3 during passage through the passageway 35. As illustrated in FIG. 7, at least one portion of the passage ridge 12a is formed to project into a block-shaped spatial domain 37. At least one portion of the passage ridge 11a is formed to project into a block-shaped domain 38. Such constructions of the ridges 11a and 12a prevent the lateral edges 3b and 3c from turning around the peripheries of the flanges 6 and 9 when the film 3 is wound up into the cassette shell 2. Lower passage ridges 13a and 14a are formed on the lower passage surface 35b to be in contact with the front surface of the film 3.

The block-shaped domain 37 is defined to be the interior of a quadrangular prism, which is a locus of trapezoid PQTS as moved in the direction of advancing the leader 3a from a position where the leader 3a is separated from the roll of the film 3. The block-shaped domain 38 is defined to be symmetrical to the domain 37 with respect to the plane 33 as illustrated in FIG. 5. Naturally, the domain 38 is in contact with the inside face 6a of the flange 6.

The operation of the cassette 1 will now be described. A camera is loaded with cassette 1. A mechanism of the camera rotates the spool 4 in the direction A in FIG. 1. The pin 7a is pressed by the cam edge 5b and shifted inward within the cam groove. With assistance from the biasing force of the spring 10, flange 9 is brought closer to the flange 6. The roll of the film 3 is clamped between the flanges 6 and 9 such that the whole length of the lateral edge 3b is in contact with the flat face 9a of the flange 9 as illustrated in FIG. 2. Even if the width W should equal to or less than 34.9 mm, the flange 9 moves close enough to the flange 6 so that the roll can be consistently clamped. The lateral edge 3b of the film 3 is pressed not only by the lip bevelled face 8a but by the flat face 9a. The rotation of the flanges 6 and 9 is transmitted to the roll of the film 3, which is rotated together with the flanges 6 and 9.

When the whole of the lateral edge 3b is in contact with the flat face 9a, no contact is made by the film 3 with the ridges 12 or 14 disposed near the flange 9. The friction of the film 3 against ridges 11 and 13 is also decreased. The spool 4 thus can be rotated by applying only a small torque. During rotation of the spool 4, the leading end of the leader 3a comes into contact with the separator 39, which separates it from the roll and directs it to the outside through the passageway 35. The roll of the film 3 is so firmly clamped by the flanges 6 and 9 that the leader 3a can be advanced against the resistance of the plush 36. There will be no slip between the film 3 and the flange 6 or 9, and looseness will not develop within the inner roll of the film 3.

When all frames of the film 3 have been exposed, the film rewind mechanism of the camera is driven to rotate the spool 4 reverse to the arrow A. The pin 7a is slid by contact with the cam edge 5d as illustrated in FIG. 6. The circumference 21 around the lip bevelled face 8a moves away from the flange 6 to a distance larger than the width W of the film 3. The film 3 is wound up without lateral flexure. When the pin 7a is received in the recess 5c, the present interval between the flanges 6 and 9 is maintained.

In the final stage of rewinding the film 3, the diameter of the roll of the film 3 grows larger. The outermost turn of the roll, however, will not tend to wrap around the periphery of the flange 6 or 9, because the ridges 11a and 12a project into the block-shaped domains 37 and 38 and the ridges 11 to 14 project into the annular domains 15 and 16. If the ridges 12, 14 should not project into the domain 15, e.g. their projecting portion extends from the plane 26 toward the flange 9, project into the cylinder 25, but have no point in common with the cone 31, then the lateral edge 3b would tend to wrap around the periphery of the flange 6. Should the ridges 12, 14 be located only on the side with respect to the plane 26 opposite to the flange 9, then there would be an undesirable contact between image frames of the film 3 and the ridges 12, 14, possibly causing damage to the image frames. Should the ridge projecting portion have no point in common with the cylinder 25, naturally the ridges 12, 14 would be insufficient in their effect to reduce the roll diameter. Should the ridge projecting portion project into the cylinder 24, naturally the lip bevelled face 8a would have no effect on the film 3 because the roll would be tightened too much. In the inventive cassette, the film 3 is fully wound up and contained in the cassette shell 2, without failure due to the lateral edge 3b or 3c being caught between the periphery of the flange 6 or 9 and the inside surface of the cassette shell 2.

Figure 8:
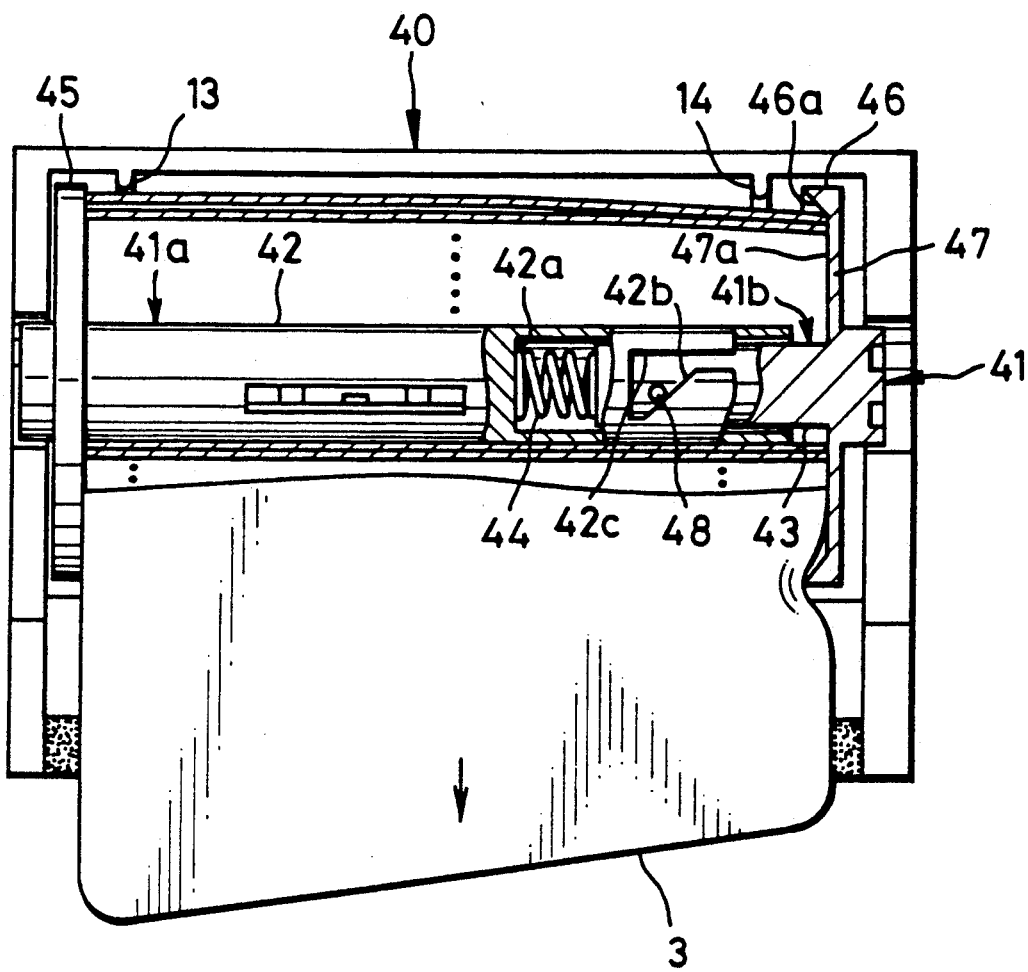
FIG. 8 is a vertical section illustrating the second preferred embodiment of the present invention.

In FIG. 8 illustrating a second preferred embodiment of the present invention, a cassette 40 has a length adjusting mechanism different from the above embodiment discussed. A spool 41 is constituted by a pair of spool pieces 41a and 41b. A core 42 of the spool piece 41a has a hallow portion 42a, which receives a core 43 of the spool piece 41b. Between a bottom of the hollow portion 42a and a distal end of the core 43 is disposed a coil spring 44 for biasing the spool pieces 41a and 41b in directions away from one from another. A cam groove is formed in connection with the hollowness 42a, and has a cam edge 42b and a triangular recess 42c. A cam follower or pin 48 is formed on the core 43 to be in contact with the cam edge 42b and be received in the recess 42c. The range of the cam groove in the widthwise direction of the film 3 is determined such that a distance from a flange 45 to a flat face 47a of a flange 47 of the core 43 varies decreasingly to a distance equal to or less than the standard width W of the film 3, or to 34.9 mm or below.

When the spool 41 of the cassette 40 is rotated in the film unwinding direction, the pin 48 is slid, within the cam groove, toward the flange 45, by virtue of contact with the cam edge 42b, against the force of coil spring 44. Thus the film 3 is clamped between an inside face of the flange 45 and the flat face 46a. When rotating the spool 41 in the wind-up direction, the pin 48 presses the edge of the recesses 42c, during which the coil spring 44 causes the spool pieces 41a and 41b to slide relatively so as to move the flanges 45 and 46 apart, so that the interval between the flange 45 and the outer circumference of a lip bevelled face 46a of a lip 46 around the flange 47 is greater than the width W of the film 3.

Figure 9:
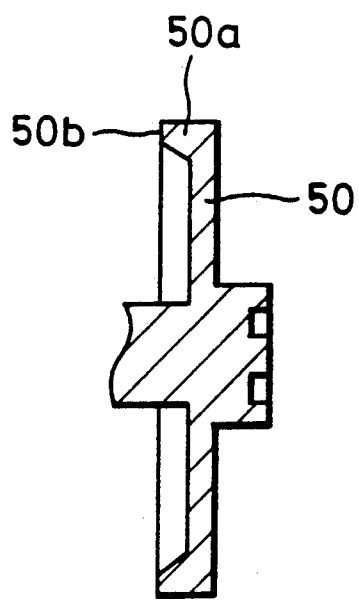
FIGS. 9-11 are sections, partially cutaway, illustrating variant forms of a lip-formed flange.
Figure 10:
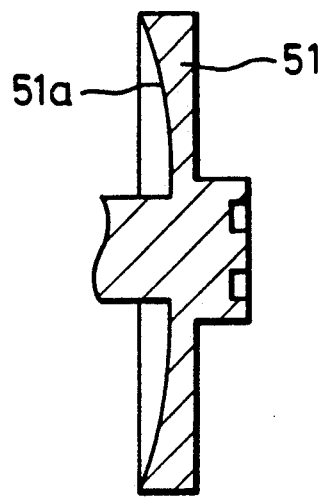
Figure 11:
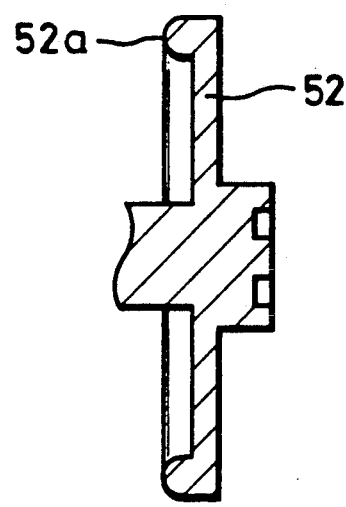

Instead of the above flange 9 or 47 having the lip 8 or 46, different shapes of a lip-formed flange may be used. Referring to FIG. 9, a flange 50 has a lip 50a having a lip bevelled face encircled by an annular flat face 50b. FIG. 10 illustrates a flange 51 having a concave inside face 51a. FIG. 11 illustrates a flange 52 having a lip 52a of which the annular top is rounded in a convex fashion.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic film cassette having a spool for winding photographic film in a roll between first and second flanges, and a cassette shell for containing said spool rotatably in a roll chamber defined therein, a leader of said film being separated by a separator claw from said roll of said film in rotation with said spool while said spool rotates in an unwinding direction, said leader thereby being caused to advance to an outside of said cassette shell through a film passage mouth defined in said cassette shell, said cassette comprising:
    a circumferential lip formed on a periphery of said first flange and projecting toward said roll;
    an inclined face formed on said lip so as to come into contact with a lateral edge of said film along at least an outer turn of said roll;
    a first annular ridge formed in said roll chamber so as to come into contact with a cylindrical surface of said roll in order to maintain a diameter of said roll which is one of equal to and less than a diameter of an outer circumference of said inclined lip face;
    a length adjusting device coupled to said spool so as to change said spool from a lengthened state to a shortened state when said spool is rotated in said unwinding direction, and so as to change said spool from said shortened state to said lengthened state when said spool is rotated in a wind-up direction which is opposite to said unwinding direction, in said shortened state an interval $L_1$ between a middle face of a central portion of said first flange and an inside face of said second flange being one of equal to or less than a standard width W of said film so as to clamp lateral sides of said roll between said first and second flanges, in said lengthened state an interval $L_2$ between outer circumference of said lip and said inside face of said second flange is greater than said standard width W in order to define a gap between said lip and a corresponding one of said lateral sides and to release said lateral sides from being clamped by said flanges.

2. A photographic film cassette as claimed in claim 1, wherein said cassette shell comprises a pair of resinous shell halves.

3. A photographic film cassette as claimed in claim 2, wherein a second annular ridge is formed in said roll chamber at a position inward from said second flange and being symmetrical to said first annular ridge so as to come into contact with said cylindrical surface of said roll.

4. A photographic film cassette as claimed in claim 3, wherein said inclined lip face and said middle face constitute a continuous concave surface.

5. A photographic film cassette as claimed in claim 3, wherein said middle face is a flat surface.

6. A photographic film cassette as claimed in claim 5, wherein an annular flat face is formed around said inclined lip face and facing said roll.

7. A photographic film cassette as claimed in claim 5, wherein said inclined lip face has a rounded convex surface.

8. A photographic film cassette as claimed in claim 5, wherein said spool comprises first and second spool pieces supported by said cassette shell respectively in cantilever fashion;
    said first spool piece includes a first core, said first flange, said lip and a cam follower; and
    said second spool piece includes a second core, said second flange and a cam groove;
    said second core is coupled with said first core in a rotatable and slidable manner; and said cam follower is received in said cam groove, so as to change said spool between said lengthened and shortened states, when said first and second spool pieces are rotated relatively, said cam follower and said cam groove constituting said length adjusting device.

9. A photographic film cassette as claimed in claim 8, wherein, during rotation of said first spool piece in said unwinding direction, said cam follower interacts with said cam groove so that said second spool piece is slid relative to said first spool piece in an initial stage of said rotation of said first spool piece so that said spool is changed from said lengthened state to said shortened state, and then said first and second spool pieces rotate integrally while retaining in said shortened state.

10. A photographic film cassette as claimed in claim 9, wherein:
said first core has a first end supported by said cassette shell and a second end having said cam follower formed thereon; and
said second core has a third end supported by said cassette shell and a fourth end fitted on said second end, said cam groove being formed in said fourth end.

11. A photographic film cassette as claimed in claim 10, wherein said second end is a rod, and said fourth end is a hollow cylinder, said second end is fitted in a hollow portion of said fourth end.

12. A photographic film cassette as claimed in claim 11, wherein a trailer of said film is anchored on said second core.

13. A photographic film cassette as claimed in claim 12, wherein said cam groove has a first cam edge inclined relative to a central axis of said spool for contact with said cam follower when said first spool piece rotates in said unwinding direction relative to said second spool piece.

14. A photographic film cassette as claimed in claim 13, wherein said length adjusting device includes a biasing member disposed in said hollow portion of said second core for biasing said rod outward in order to release said roll from said flanges.

15. A photographic film cassette as claimed in claim 14, wherein a recess is formed in said cam groove facing said first cam edge so as to receive said first spool piece rotates in said wind-up direction relative to said second spool piece.

16. A photographic film cassette as claimed in claim 15, wherein said biasing means is a coil spring.

17. A photographic film cassette as claimed in claim 13, wherein said length adjusting means includes a biasing member coupled to said first flange so as to bias said first flange toward said second flange.

18. A photographic film cassette as claimed in claim 17, wherein said cam groove has a second cam edge formed in opposition to said first cam edge so as to contact with said cam follower when said first spool piece rotates in said wind-up direction relative to said second spool piece.

19. A photographic film cassette as claimed in claim 18, wherein said biasing member is a spring washer.

20. A photographic film cassette as claimed in claim 19, wherein a recess is formed on said cam groove adjacent to said second cam edge so as to receive said cam follower therein after said cam follower is guided by said second cam edge to a position corresponding to said lengthened state.

21. A photographic film cassette as claimed in claim 20, wherein at least one portion of said first annular ridge projects into a first spatial domain in order to prevent said first lateral edge of said film from wrapping around an outside of said lip formed on a periphery of said first flange when said film is wound up into said cassette shell, wherein said first domain is an interior of a body of revolution being a locus of quadrilateral PQTS as revolved around said central axis of said spool, P is one point lying on said outer circumference of said lip when said spool is in said shortened state, Q is a point at 3 mm spaced away from said point P toward said second flange in a direction of said axis, S is a point where a line passing through a point R and parallel with said axis intersects a line passing through point P and vertical to said axis, letting R be a point where an inner circumference of said lip is crossed by a plane in which said point p and said axis lie, and T is a point at 5.5 mm spaced away from point S toward said second flange in said axial direction.

22. A photographic film cassette as claimed in claim 21, wherein said roll chamber and said film passage mouth are connected together by a film passageway defined between a lower passage surface formed on said cassette shell and facing a front surface of said film, passing through said passageway, which is positioned inward when wound within said roll, and an upper passage surface formed on said cassette shell and facing a back surface of said film which is opposite said front surface, and
a first passage ridge being formed on said upper passage surface, so as to be continuous with said first annular ridge, for supporting said first lateral edge of said film during passage of said film through said passageway after being flexed laterally by said lip in order to prevent said back surface from contact with said upper passage surface.

23. A photographic film cassette as claimed in claim 22, wherein at least one portion of said first passage ridge projects into a second spatial domain in order to prevent said first lateral edge of said film from wrapping around said outside of said lip when said film is wound up into said cassette shell, wherein said second domain is an interior of a quadrangular prism being a locus of said quadrilateral PQTS as moved in a direction of advancing said leader of said film from a position corresponding to a separation of said leader from said roll.

24. A photographic film cassette as claimed in claim 23, wherein a second passage ridge is formed on said upper passage surface so as to be continuous with said second annular ridge for supporting a second lateral edge of said film during passage of said film through said passageway in order to prevent said back surface from coming into contact with said upper passage surface.

25. A photographic film cassette as claimed in claim 24, wherein said separator claw is disposed at a position proximate said second lateral edge of said film with reference to a lengthwise direction of said cassette shell.

26. A photographic film cassette as claimed in claim 25, wherein a leading end of said leader is cut slantwise so as to cause a side of said second lateral edge to project from said leader.

27. A photographic film cassette as claimed in claim 26, wherein at least one portion of said second passage ridge projects into a third spatial domain in order to prevent said second lateral edge from wrapping around an outside of said second flange when said film is wound up into said cassette shell, wherein said third domain is a domain of a body of a revolution which is symmetrical to said first domain with respect to one plane vertical to said axis and is in contact with said inside face of said second flange.

28. A photographic film cassette as claimed in claim 27, wherein at least one portion of said second passage ridge projects into a fourth spatial domain in order to prevent said second lateral edge from turning around said outside of said second flange when winding said film up into said cassette shell, wherein said fourth domain is a domain of a quadrangular prism symmetrical to said second domain with respect to said one vertical plane.

29. A photographic film cassette as claimed in claim 28, wherein third and fourth passage ridges are formed on said lower passage surface in opposition to said first and second passage ridges respectively for supporting said lateral edges during passage of said film through said passageway in order to prevent said front surface from coming into contact with said lower passage surface.

* * * * *